Nov. 19, 1963 V. L. J. DI RITO ETAL 3,111,328
MULTIUSE ADAPTER FOR MANIPULATORS
Filed July 3, 1961 2 Sheets-Sheet 1
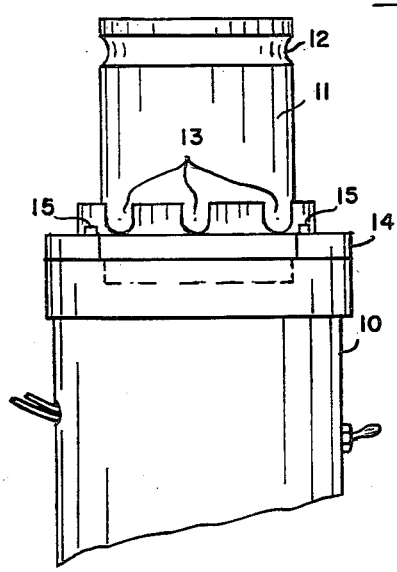
Fig-1
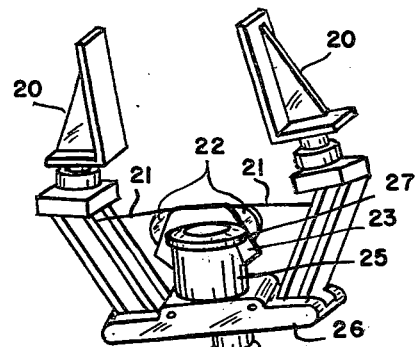
Fig-2
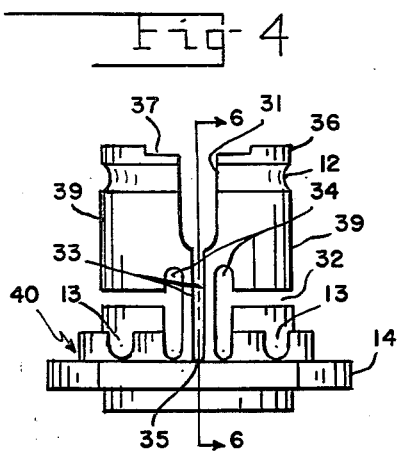
Fig-4
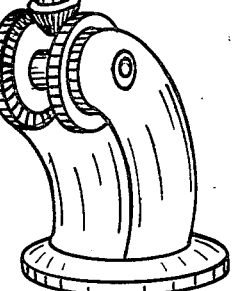
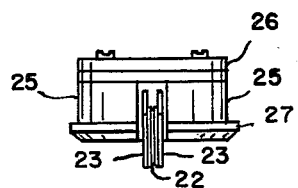
Fig-3
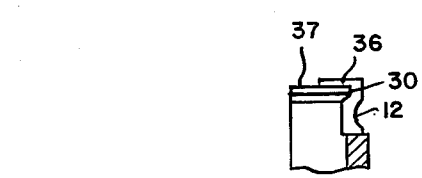
Fig-7
INVENTORS
VINCENT L. J. DI RITO
LASZLO B. HARY
BY
ATTORNEY
AGENT Nov. 19, 1963 V. L. J. DI RITO ETAL 3,111,328
MULTIUSE ADAPTER FOR MANIPULATORS
Filed July 3, 1961 2 Sheets-Sheet 2
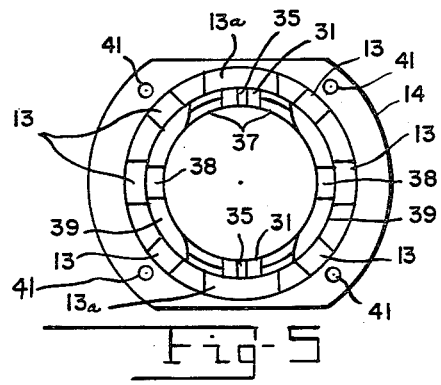
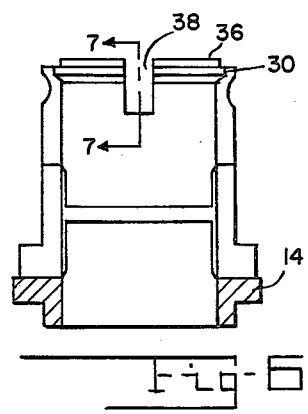
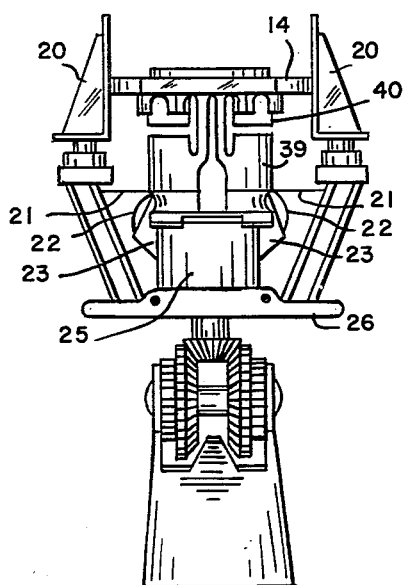
INVENTORS
VINCENT L. J. DI RITO
LASZLO B. HARY
BY
ATTORNEY
AGENT

United States Patent Office 3,111,328
Patented Nov. 19, 1963

3,111,328
MULTIUSE ADAPTER FOR MANIPULATORS
Vincent L. J. Di Rito and Laszlo B. Hary, Dayton, Ohio, assignors to the United States of America as represented by the Secretary of the Air Force
Filed July 3, 1961, Ser. No. 121,793
4 Claims. (Cl. 279—41)
(Granted under Title 35, U.S. Code (1952), sec. 266)

The invention described herein may be manufactured and used by or for the United States Government for governmental purposes without payment to us of any royalty thereon.

This invention relates to an adapter which may be attached to power tools to make them usable with either the Argon Model 8 master-slave manipulator or the General Mills mechanical arm manipulator.

In order to perform necessary disassembly and other operations of irradiated systems and components in Hot Laboratories, it is necessary to manipulate by remote handling various electrically powered standard tools such as drills and screw drivers.

Most of these tools now in use are operated by electrically controlled General Mills mechanical arm manipulators Model 300. For some operations, it is desirable to use these tools with the manually controlled Argon type Model 8 master-slave manipulators.

According to this invention, these tools were adapted for use with the Model 8 manipulators by modifying the slave end of the Model 8 manipulator and by providing a modified adapter on the power tools.

One object of the invention is to provide improved operational capability of power tools used with manipulators.

A further object of the invention is to provide power tools, for use with manipulators, capable of rapid interchange between the mechanical arm manipulators and the manually controlled Model 8 manipulators.

These and other objects will be more fully understood from the following description taken with the drawing wherein:

FIG. 1 shows a conventional adapter for a General Mills mechanical arm Model 300 manipulator with a cutaway portion of a power tool attached thereto in the usual manner;

FIG. 2 shows a perspective view of a modified slave end of an Argon Model 8 master-slave manipulator;

FIG. 3 shows a side view of the modified slave end attachment;

FIG. 4 is a side view of an adapter modified in accordance with this invention;

FIG. 5 shows a top end view of the device of FIG. 4;

FIG. 6 shows a sectional view of the device of FIG. 4 taken along the line 6—6;

FIG. 7 shows a partial sectional view taken along the line 7—7 of FIG. 6; and

FIG. 8 shows the modified slave end of FIG. 2 together with the modified adapter of this invention.

Referring more particularly to FIG. 1 of the drawing which shows a portion of a power tool 10 having a conventional adapter 11 attached thereto. The adapter has an annular groove 12 therein for retaining the power tool in a mechanical arm manipulator. The notches 13 are for manipulating the tool and for locking the tool against rotation when it is in operation. The tool is attached to the adapter flange 14 by four screws 15, two of which are shown.

The slave end for the Model 8 manipulator shown in FIG. 2 has manipulator jaws 20 operated by cables 21 which pass over pulleys 22 which are held by plates 23; one of which is shown in this figure. A pair of flanged elements 25, one of which is shown in this figure, were attached to the slave end with one element on each of the pulleys as shown in FIG. 3 so that the power tools might be used with the manipulator slave end. These were attached to the manipulator jaw support 26 with four screws, two of which are shown in FIG. 3. The flange 27 is provided for attachment of the adapter of this invention.

The adapter shown in FIG. 4 is a modification of the standard adapter shown in FIG. 1. The groove 12 and notches 13 and flange 14 are substantially the same as in the device of FIG. 1. The device of FIG. 4 has a groove 30 of substantially the same shape as flange 27, cut in the inner wall near the top, as shown in FIG. 6 and FIG. 7, to provide hook shaped elements as a means for attaching the power tool to the slave end of the Model 8 manipulator. A pair of slots 31 are provided so that the sides of the adapter may be spread to permit the insertion of the flange 27. The side walls of the adapter are cut at 32 to permit the spreading of the sides of the adapter. Spring elements 33 are provided by cutting side slots 34 and central slots 35 in the wall of the adapter. This provides two substantially semicylindrical shaped elements 39 attached to an annular base member 40. To limit the amount of spread necessary to attach the tool to the Model 8 manipulator slave end, the top retainer flange 36 of groove 30 is cut away at 37. Slots 38 are cut in the wall of the semicylindrical elements 39 for receiving the elements 21, 22 and 23 of the slave end. The flange 14 has four holes 41 for attaching the adapter to the power tool as shown in FIG. 1. Adapters built according to this invention were made of cadmium plated 6150 steel. The completed adapters were heated to 1600° F., rapid quenched in oil and then drawn to 900° F. to provide a Rockwell hardness rating of 42 to 45. Other materials which will provide the strength and spring action may be used. The particular tool used in slot 31 to spread the sides of the adapter does not form a part of this invention.

While the adapter for the General Mills 300 mechanical arm manipulator has been described above as the one modified for use with Argon Model 8 master-slave manipulators, adapters for other mechanical arm manipulators such as the General Mills Models 100, 500 and 550 may also be so modified. For the purpose of this invention these shall all be referred to as Model 300 type mechanical arm manipulators. Also the master-slave manipulator may be any Model 8 master-slave manipulator.

There is thus provided an adapter which may be used to attach power tools to either the Argon Model 8 manipulator or the General Mills 300 manipulator.

While one specific embodiment has been described in detail, it is obvious that certain changes may be made without departing from the general principle and scope of the invention.

We claim:
1. An adapter for attaching power tools to either a mechanical aram manipulator or a master-slave manipulator, modified slave end, having a substantially circular projecting flange, comprising: an annular base member; a pair of substantially semicircular shaped members; a plurality of spring means for coaxially attaching adjacent edges of said semicircular members to said annular base member; said semicircular members being spaced from the other at their adjacent edges; a plurality of hook shaped elements forming inwardly facing grooves in the ends of said semicircular members, remote from said spring means; a longitudinal slot equally spaced from said adjacent edges of each of said semicircular member at the end remote from said spring means; a pair of circumferential grooves in the outer wall of each of said semicircular members extending from said longitudinal slots to said adjacent edges; said annular member having a raised portion thereon; said raised portion having a plurality of longitudinal slots therein; and a flange on said annular member adjacent said raised portion.

2. An adapter for attaching power tools to either a mechanical arm manipulator or a master-slave manipulator, modified slave end, having a substantially circular projecting flange, comprising: an annular base member; a pair of substantially semicircular shaped members; a pair of spring means connected between each of said semicircular members and said base member for coaxially attaching adjacent edges of said semicircular members to said annular base member; said semicircular members being spaced from the other at their adjacent edges, to thereby form a first pair of longitudinal slots therebetween; said slots being larger at the end of said semicircular members remote from said base member; a second pair of longitudinal slots, one in each of said semicircular members, equally spaced from said adjacent edges of each of said semicircular members at the end remote from said spring means; a pair of circumferential grooves in the outer wall of each of said semicircular members extending from said second longitudinal slot to said adjacent edges; a plurality of hook shaped elements forming inwardly facing grooves in the ends of said semicircular members, remote from said spring means; said inwardly facing grooves extending from said second longitudinal slot a distance on the inner wall less than the distance from said second slot to said edges; said annular member having a raised portion thereon; a plurality of longitudinal slots therein; and a flange on said annular member adjacent said raised portion.

3. An adapter for attaching power tools to either a mechanical arm manipulator or a master-slave manipulator, modified slave end, having a substantially circular projecting flange, comprising: a substantially tubular shaped member; a flange spaced from one end of said tubular member; said tubular member having a raised portion adjacent said flange; said raised portion having a plurality of longitudinal slots therein; a groove in the outer wall of said tubular member, spaced from the end remote from said flange; a second groove in the inner wall of said tubular member adjacent the same end as said outer groove; a first pair of diametrically opposed slots in the wall of said tubular member extending from said flange to the end adjacent said grooves; said last-named slots being larger at the end adjacent said grooves than at the end adjacent said flange, to thereby provide means for spreading the sides of said tubular member; a second pair of diametrically disposed slots in the side walls of said tubular member angularly spaced substantially 90 degrees from said first pair of slots; means in the side walls of said tubular member for permitting spreading of the side walls of said tubular member and means adjacent said first pair of slots for resisting the spreading of said side walls.

4. An adapter for attaching power tools to either a mechanical arm manipulator or a master-slave manipulator, modified slave end, having a substantially circular projecting flange, comprising: a substantially tubular shaped member; a flange spaced from one end of said tubular member; said tubular member having a raised portion adjacent said flange; said raised portion having a plurality of longitudinal slots therein; a groove in the outer wall of said tubular member, spaced from the end remote from said flange; a second groove in the inner wall of said tubular member adjacent the same end as said outer groove; a first pair of diametrically opposed slots in the wall of said tubular member extending from said flange to the end adjacent said grooves; said last-named slots being larger at the end adjacent said grooves than at the end adjacent said flange, to thereby provide means for spreading the sides of said tubular member; a second pair of diametrically disposed slots in the side walls of said tubular member angularly spaced substantially 90 degrees from said first pair of slots; a pair of spring elements adjacent each of said first pair of slots for resisting the spreading of said side walls; and a pair of diametrically opposed circumferential slots extending from the spring elements adjacent one of said first pair of slots to the spring elements adjacent the other of said first pair of slots.

References Cited in the file of this patent

UNITED STATES PATENTS

| | | |
|---|---|---|
| 1,983,950 | Sheffer | Dec. 11, 1934 |
| 2,626,667 | Spiller | Jan. 27, 1953 |